United States Patent
Park

(10) Patent No.: US 7,028,220 B2
(45) Date of Patent: Apr. 11, 2006

(54) METHODS FOR SAVING DATA ON THE BASIS OF THE REMAINING CAPACITY OF A BATTERY IN A SUSPEND MODE AND RESUMING OPERATIONS USING THE SAVED DATA

(75) Inventor: Jeong Min Park, Seoul (KR)

(73) Assignee: LG Electronics Inc., Seoul (KR)

( * ) Notice: Subject to any disclaimer, the term of this patent is extended or adjusted under 35 U.S.C. 154(b) by 191 days.

(21) Appl. No.: 10/233,406

(22) Filed: Sep. 4, 2002

(65) Prior Publication Data

US 2003/0046503 A1 Mar. 6, 2003

(30) Foreign Application Priority Data

Sep. 4, 2001 (KR) .............................. 2001-54170

(51) Int. Cl.
*G06F 11/00* (2006.01)

(52) U.S. Cl. .............................. 714/22; 714/6; 713/300; 320/127; 711/162; 365/226

(58) Field of Classification Search .................. 714/22, 714/24, 14, 6, 21; 713/300, 320, 330, 340, 713/323; 711/162; 365/227, 228, 229; 320/127
See application file for complete search history.

(56) References Cited

U.S. PATENT DOCUMENTS

| | | | | |
|---|---|---|---|---|
| 5,341,503 A * | 8/1994 | Gladstein et al. | ........... | 713/340 |
| 5,345,392 A * | 9/1994 | Mito et al. | ........... | 713/300 |
| 5,459,671 A * | 10/1995 | Duley | ........... | 702/63 |
| 5,485,623 A * | 1/1996 | Kurokawa et al. | ........... | 714/22 |
| 5,666,540 A * | 9/1997 | Hagiwara et al. | ........... | 713/323 |
| 5,708,820 A * | 1/1998 | Park et al. | ........... | 713/323 |
| 5,710,931 A * | 1/1998 | Nakamura et al. | ........... | 713/323 |
| 5,714,870 A * | 2/1998 | Dunstan | ........... | 713/321 |
| 5,804,894 A * | 9/1998 | Leeson et al. | ........... | 307/130 |
| 5,818,200 A * | 10/1998 | Cummings et al. | ........... | 320/116 |
| 5,845,134 A * | 12/1998 | Arai | ........... | 713/322 |
| 5,920,728 A * | 7/1999 | Hallowell et al. | ........... | 713/340 |
| 5,990,664 A * | 11/1999 | Rahman | ........... | 320/136 |
| 6,006,351 A * | 12/1999 | Peretz et al. | ........... | 714/751 |
| 6,049,193 A * | 4/2000 | Chien | ........... | 320/132 |
| 6,101,601 A * | 8/2000 | Matthews et al. | ........... | 713/2 |
| 6,114,836 A * | 9/2000 | Hagiwara et al. | ........... | 320/132 |
| 6,243,831 B1 * | 6/2001 | Mustafa et al. | ........... | 714/24 |
| 6,266,786 B1 * | 7/2001 | Chang | ........... | 714/22 |
| 6,408,196 B1 * | 6/2002 | Sheynblat et al. | ........... | 455/574 |
| 6,445,088 B1 * | 9/2002 | Spitaels et al. | ........... | 307/66 |
| 6,445,932 B1 * | 9/2002 | Soini et al. | ........... | 455/556.1 |
| 6,483,274 B1 * | 11/2002 | Lee | ........... | 320/132 |
| 6,643,786 B1 * | 11/2003 | Kawakami | ........... | 713/340 |
| 2002/0138772 A1 * | 9/2002 | Crawford et al. | ........... | 713/300 |
| 2003/0033549 A1 * | 2/2003 | Liu | ........... | 713/300 |
| 2003/0041125 A1 * | 2/2003 | Salomon | ........... | 709/220 |
| 2003/0149866 A1 * | 8/2003 | Neuman et al. | ........... | 713/1 |

* cited by examiner

*Primary Examiner*—Hong Kim
(74) *Attorney, Agent, or Firm*—Birch, Stewart, Kolasch & Birch, LLP

(57) ABSTRACT

The present invention discloses a method for saving data including system status data stored in a memory to a backup server via a data communication network if the remaining capacity of the battery is not sufficient, by confirming continuously the remaining capacity of the battery, in a suspend mode in a computer system. Accordingly, the present invention previously prevents important data from losing although the system-down is occurred abruptly by the perfect discharge of the battery.

16 Claims, 3 Drawing Sheets

METHODS FOR SAVING DATA ON THE BASIS OF THE REMAINING CAPACITY OF A BATTERY IN A SUSPEND MODE AND RESUMING OPERATIONS USING THE SAVED DATA

BACKGROUND OF THE INVENTION

1. Field of the Invention

The present invention relates to methods for saving data including system status data stored in a memory to a backup server via a data communication network on the basis of the remaining capacity of a battery in a suspend mode, and resuming operations using the saved data when a resume mode, a wake-up mode or a power-on mode is occurred in a computer system.

2. Description of the Background Art

In a portable computer system such as a notebook computer, a PDA (Personal Digital Assistants) and a Web PAD etc., which uses mainly battery charge power rather than firm power, power management functions are prepared for extending the battery driving time (that is, for saving the battery power). There is a suspend mode as an example of the power management functions.

In the suspend mode, it is stopped to supply power to the rest of the devices, except for the some devices including a memory in which the data necessary for returning to the present status of the system is stored. That is, when a suspend mode signal is occurred, the system is controlled so that the status of the CPU (Central Processing Unit) and the status of various peripheral devices just before the suspend mode is saved to the memory and the power is provided to only some devices such as the memory etc. At this state, an operation pause status according to the suspend mode is maintained until a resume mode or a wake-up mode is requested.

However, in the data saving method of the conventional portable system as described above, there is a disadvantage that since the battery power is continuously supplied to some devices such as the memory etc. even in the suspend mode, if the suspend mode is lasted for a long time, the system-down may be occurred by the perfect discharge of the battery and thereby all the data stored in the memory may be lost.

SUMMARY OF THE INVENTION

Therefore, the present invention has been made in order to solve the above problem, an object of the invention is to provide a method for saving data on the basis of the remaining capacity of a battery, in which data including the system status data stored in a memory is saved to the predetermined backup server via a data communication network if the remaining capacity of the battery is not sufficient in a suspend mode, thereby previously preventing the data from losing caused by the perfect discharge of the battery.

Another object of the invention is to provide a method for resuming operations using the data saved in the server by the data saving method when a resume mode, a wake-up mode or a power-on mode is occurred.

In accordance with one aspect, the present invention provides a method for saving data on the basis of the remaining capacity of a battery including: a first step for storing the present system status data into a memory in a suspend mode conversion and confirming continuously the remaining capacity of the battery; a second step for transmitting and storing the data stored in the memory to a backup server via a data communication network when the confirmed the remaining capacity of the battery is below a reference value; and a third step for returning to the suspend mode after the data is saved to the server.

In accordance with other aspect, the present invention provides a method for resuming operations in a portable computer system which resume the operations from a suspend mode comprising: a first step for checking whether system status data just before the suspend mode is saved in a backup server; a second step for connecting to the backup server via a data communication network and receiving the system status data saved in the backup server according to the checking result; and a third step for returning to the state prior to the suspend mode using the received system status data.

BRIEF DESCRIPTION OF THE DRAWINGS

The present invention will become better understood with reference to the accompanying drawings that are given only by way of illustration and thus are not limitative of the present invention, wherein.

DETAILED DESCRIPTION OF THE PREFERRED EMBODIMENTS

A method for saving data on the basis of the remaining capacity of a battery in a suspend mode and a method for resuming operations using the saved data in accordance with preferred embodiments of the present invention will now be described in detail with reference to the accompanying drawings.

Figure 1:
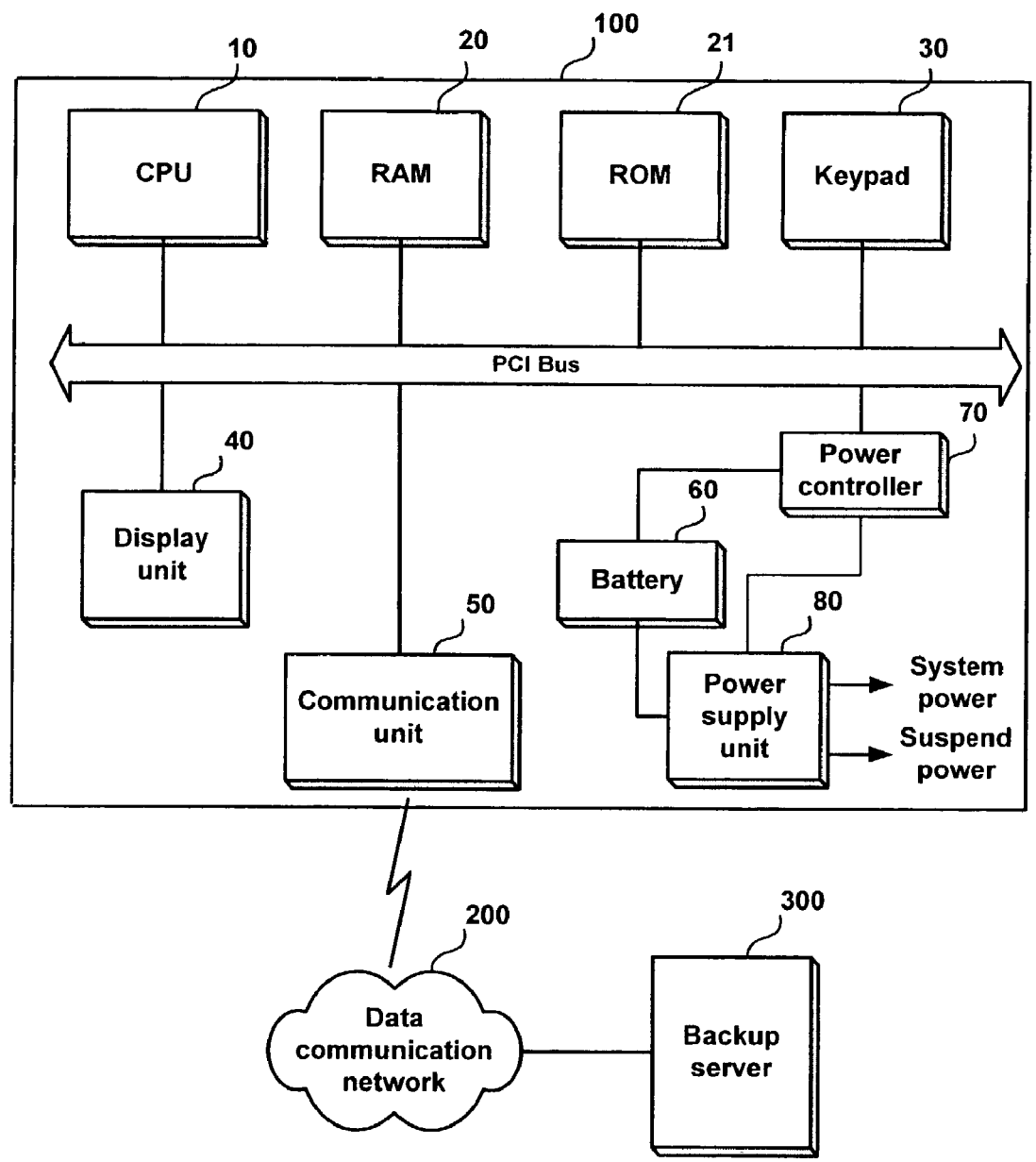
FIG. 1 is a view illustrating a construction of a portable system and a network to which a data saving method on the basis of the remaining capacity of a battery in accordance with the present invention is applied.

FIG. 1 is a view illustrating a construction of a portable system and a network to which a data saving method on the basis of the remaining capacity of a battery in accordance with the present invention is applied.

As shown in FIG. 1, a portable system 100, to which the method of the present invention is applied, comprises a CPU (Central Processing Unit) 10, memories 20 and 21, a keypad 30, a display unit 40, a communication unit 50, a battery 60, a power controller 70 and a power supply unit 80.

The memories comprise a ROM (Read Only Memory) 21 in which BIOS (Basic Input and Output System) routines of the system and a routine for communicating with the address of a data communication network 200 about a backup server 300 are stored, and a RAM (Random Access Memory) 20 in which various programs and data for operating the system are stored.

The keypad 30 is a device for inputting various commands or data by a user and the display unit 40 displays frames of image being implemented by the commands and data input through input devices such as the keypad 30.

The communication unit 50 is a device for performing a data communication by a connection with the data communication network 200. Here, if the data communication network 200 is a wired communication network like the internet, the communication unit 50 may be a LAN (Local Area Network) card or a modem. Also, if the data communication network 200 is a wireless data communication network like a wireless internet, the communication network 50 may be a wireless modem or a wireless LAN card.

The battery 60 is a device for providing power to each device of the system. Generally, the battery 60 supplies its remaining capacity to the system and the remaining capacity is read out periodically by the power controller 70 that will be described hereinafter. The system can always sense the present remaining capacity, charge current and voltage, and discharge current and voltage etc. of the battery by, for example, SMbus (System Management bus) communications. The battery 60 may represent the remaining capacity by 4 bits, for example, the maximum capacity as "1111", the minimum capacity as "0000" (here, the remaining capacity may be represented by 16 bits). Here, if the battery 60 does not provide its own remaining capacity to the system, it is possible to provide a unit for detecting battery status to the system and calculate the remaining capacity of the battery by using the signal detected from the detecting unit.

The power controller 70 reads out the remaining capacity of the battery 60 when there is a request of the charge status data of the battery 60 from the CPU 10, and then transmits the read data to the CPU 10. Also, the power controller 70 controls the power supply unit 80 according to power control modes of the CPU 10 so that the battery power is supplied to the whole system in a power-on mode or the battery power is supplied to only some devices in a suspend mode.

Here, the power controller 70 may be incorporated in the CPU 10 so that the CPU 10 and the controller 70 are formed into one-chip device.

The CPU 10 controls various devices according to the commands or data inputted through the keypad 30 to process the inputted commands and data. When a process command does not inputted through input devices such as the keypad 30 etc. for a predetermined time or the remaining capacity of the battery 60 is below a predetermined value, the CPU 10 controls the power supply unit 80 through the power controller 70 in order to convert to the suspend mode that only the suspend power is supplied to the system, thereby the power consumption can be saved.

The CPU 10 includes logic units for detecting operation modes of the whole system and logic units for processing routines corresponding to commands or data input from the keypad 30 or other input devices omitted in the FIG. 1.

Figure 2A:
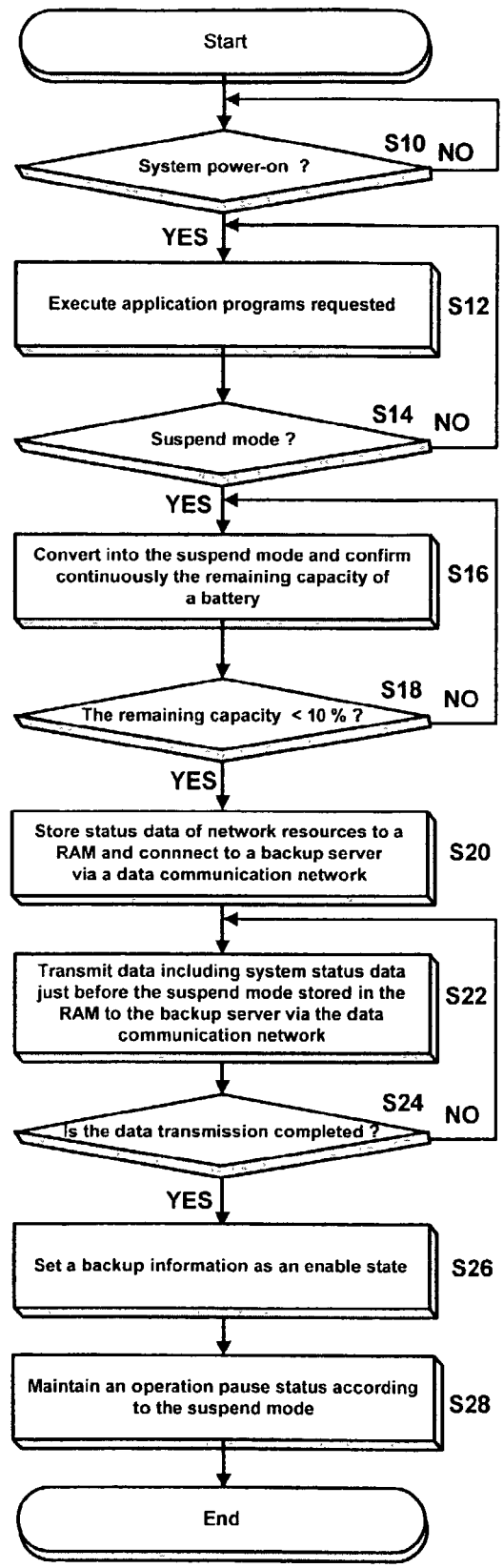
FIG. 2A is a flowchart illustrating a preferred embodiment of the data saving method on the basis of remaining capacity of a battery in accordance with the present invention.

Next, a preferred embodiment of a data saving method on the basis of the remaining capacity of a battery in accordance with the present invention will be described in detail with reference to FIG. 2A.

First, when a power supply request is occurred by an manipulation of a power-on key (step S10), the CPU 10 controls the power controller 70 so that the system power and the suspend power can be supplied to the system from the power supply unit 80. Accordingly, the charge power of the battery is supplied to each device and so the system is operated normally.

At this time, the CPU 10 performs operations such as the execution of application programs requested by the keypad 30 etc. (step S12).

In the state as described above, when commands or data from peripheral devices (for example, input devices such as the keypad 30, or the communication unit 50 etc.) do not inputted during a predetermined time or the remaining capacity of the battery 60 is below a predetermined value, the CPU 10 generates a suspend mode conversion interrupt signal (step S14).

When the suspend mode conversion interrupt signal is generated, the CPU 10 controls the power supply unit 80 through the power controller 70 so that the system power is stopped from being supplied to each devices and the suspend power is supplied only to the RAM 20 and the some logic units of the CPU 10. The some logic units include logic units related to operation resumption and a logic unit for checking the remaining capacity of the battery 60. At this time, the CPU 10 stores the status data of the system and the network resources to the RAM 20 and then converts the system into the suspend mode.

Also, the CPU 10 confirms continuously the present remaining capacity of the battery 60 from the digital data about the battery remaining capacity inputted from the power controller 70 and calculates a percentage of the remaining battery capacity (step S16).

Here, the CPU 10 may calculate the remaining battery capacity percentage from the battery remaining capacity by the following formula:

Remaining battery percentage (%)=(Battery remaining capacity ($mAh$)×100)/Full charged capacity ($mAh$).

For example, when the present battery remaining capacity is "1000(8)", the remaining battery capacity percentage is calculated by 50% since the maximum battery capacity is "1111(16)". Also, when the present read battery remaining capacity is "0010(2)", the remaining battery capacity percentage is calculated by 12.5%, and when the present read battery remaining capacity is "0001(1)", the remaining battery capacity percentage is calculated by 6.25%.

As above, as a result of confirmation of the remaining battery capacity percentage of the battery 60, when it is discriminated that the remaining capacity of the battery 60 is below the reference value, for example, 10% of the entire chargeable capacity (step S18), the CPU 10 stores the present status data of the network resources to the RAM 20 and thereafter makes the network resources revived on the basis of the status data about the network resources stored in the RAM 20. Then, the CPU 10 controls the communication unit 50 according to a routine for communicating it with the address of the data communication network about the backup server 300 stored in the ROM 21, thereby being connected it to the backup server 300 having the above address via the communication network 200 (step S20).

As described above, when the communication unit 50 is connected to the backup server 300, the data including the system status data stored to the RAM 20 just before the suspend mode is transmitted to the communication unit 50 under control of the CPU 10. The communication unit 50 transmits the received data including the system status data to the backup server 300 via the data communication network 200. Here, when the data is transmitted to the backup server 300, the portable system 100 transmits its own inherent identification code together with the data to the backup server 300. Accordingly, the backup server 300 stores the received data including the system status data into an independent storage region corresponding to the identification code.

When the transmission of the data including the system status data is completed (step S24), the CPU 10 sets the backup information, indicating that a backup copy of the data including the system status data is stored in the backup server, to its own specific BIOS register as an enable state (step S26). For example, the backup information may be set by allocating 1 bit to the BIOS register. The register bit is set as "1" when the backup copy of the data is made, while the register bit is set as "0" when the backup copy of the data is not made. Here, the backup information is set by "1".

Thereafter, the CPU 10 stops again the power from supplying to the network resources and makes the network resources non-activated according to the suspend mode. Therefore, the operation pause mode is maintained (step S28).

Here, the data including the system status data may be transmitted to the backup server 300, after the system status data is stored into a memory devices such as a compact flash card omitted in FIG. 1 instead of the RAM 20 just before the conversion of the suspend mode.

Figure 2B:
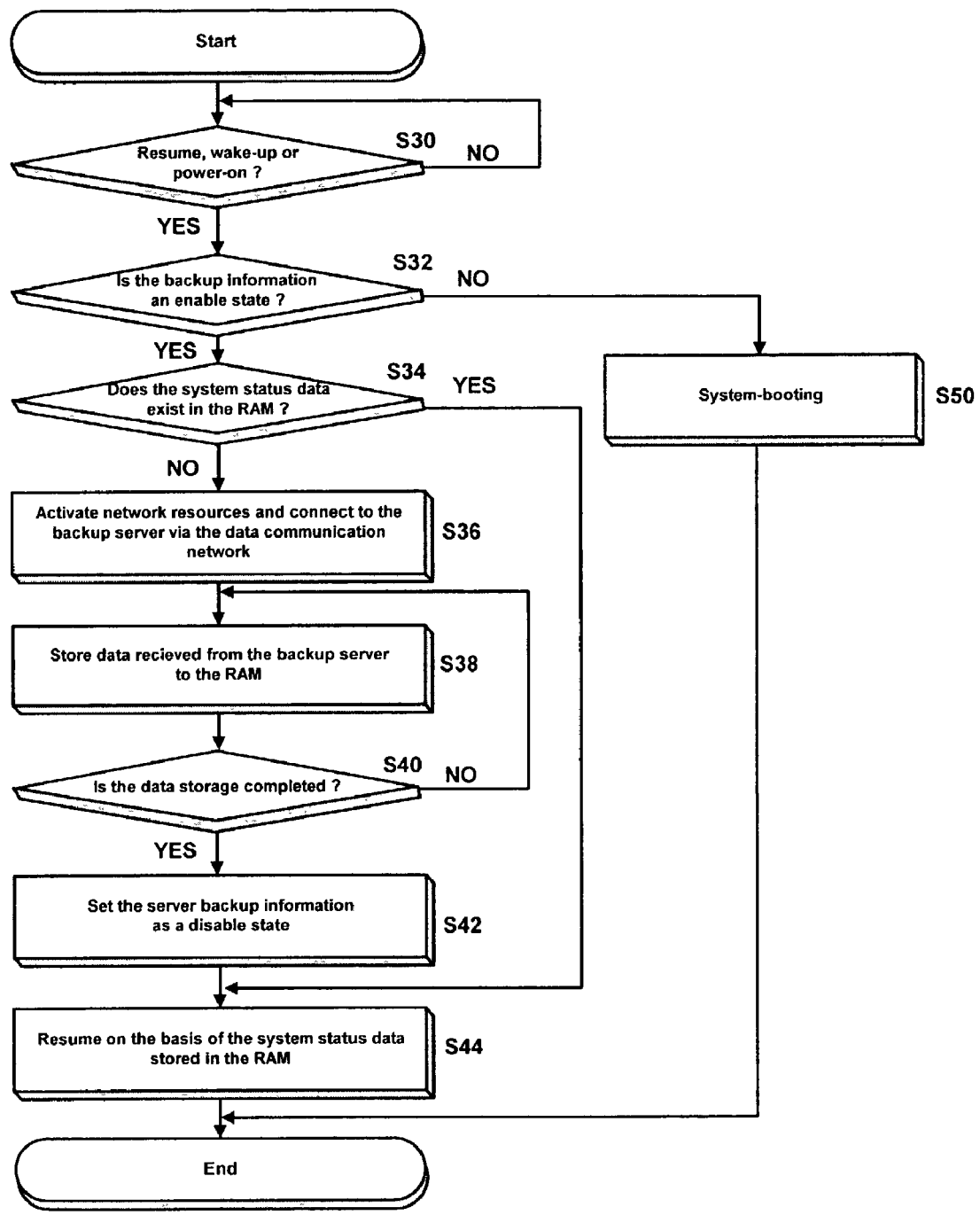
FIG. 2B is a flowchart illustrating a preferred embodiment of an operation resuming method in a system to which the data saving method in accordance with the present invention is applied.

Next, a preferred embodiment of a method for resuming operations using the saved data in a system to which the above data saving method is applied in accordance with the present invention will be described in detail with reference to FIG. 2B.

When a resume mode or a wake-up mode is requested through input devices such as the keypad 30 etc. or the communication unit 50 (step S30), the CPU 10 discriminates whether the backup information is set as an enable state (that is, whether the specific BIOS register is set by "1") by searching its own specific BIOS register (step S32).

At the step S32, if the backup information is set as an enable state, the CPU 10 confirms whether the system status data exists in the RAM 20 (step S34).

At the step S34, if the system status data exists in the RAM 20, there is a case that although the data stored in the RAM 20 is saved to the backup server 300 in the suspend mode, the battery 60 does not discharge completely and so the data stored in the RAM is alive. Accordingly, the CPU 10 performs the requested resume mode or wake-up mode by using the data including system status data stored in the RAM 20. That is, the system status is returned to the status prior to the suspend mode on the basis of the stored system status data and then the corresponding application programs are restarted (step S44).

On the other hand, when the battery 60 is discharged completely in the suspend mode, although the resume mode or wake-up mode is requested, the requested mode cannot be performed. In this case, the portable system 100 can be operated after the user charges the battery 60.

In the case that the battery 60 is charged by the user after the battery 60 is completely discharged, at the step S30, when the request of a power-on mode [a mode that the power is supplied to the system by manipulation of the power-on key] of the portable system 100 instead of the resume mode is occurred, the CPU 10 controls the power controller 70 so that the system power and the suspend power can be supplied to the system. Accordingly, the power of the battery 60 is supplied to each device and then the system is operated normally. At this time, the CPU 10 discriminates whether the backup information is set as an enable state (that is, the specific BIOS register is set by "1") by searching its own specific BIOS register (step S32).

At the step S32, if the backup information is set as an enable state, the CPU 10 confirms whether the system status data exists in the RAM 20(step S34). However, since the system status data does not exist in the RAM 20, the CPU 10 discriminates that the data stored in the RAM 20 is saved to the backup server 300 in the suspend mode and thereafter the battery 60 is discharged completely.

Thereafter, the CPU 10 makes the communication unit 50 activated according to the routine stored in the ROM 21 for communicating with the address of the data communication network about the backup server 300 and then controls the communication unit 50 so that it can be connected to the backup server 300 having the above address via the data communication network 200 (step S36).

When the communication unit 50 is connected to the backup server 300, the CPU 10 transmits an identification code of the portable system 100 to the communication unit 50 and then requests the transmission of the data including system status data stored previously in the backup server 300 corresponding to the identification code.

The CPU 10 receives the data including the system status data transmitted from the backup server 300 according to the transmission request and then stores the data again to the RAM 20 (step S38).

Thereafter, when the reception and storage of the data are completed (S40), the CPU 10 sets the backup information as a disable state by searching its own specific BIOS register (that is, the specific BIOS register is set by "0") (step S42).

Then, the CPU 10 makes the system status returned as the status prior to the suspend mode by using the data including the system status data stored in the RAM 20 and then restarts the corresponding application programs (step S44).

On the other hand, at the step S32, if the backup information does not exit, there is a case that a power-on mode is requested to the system, after a power-off of the system made in the state that the data is not saved to the backup server 300 as described with reference to the flow of FIG. 2A. Accordingly, in this case, the CPU 10 performs the system booting according to a general power-on mode (step S50).

Here, if it is discriminated that the confirmed battery remaining capacity is below 10% of the entire chargeable capacity, the CPU 10 may not perform immediately the connection to the backup server 300 and display the confirmed battery remaining capacity through the display unit 50 as a message type so that the user can perform a proper operation [that is, an operation that it makes the system power-off or the battery 60 charged]. Thereafter, when the user does not perform the above operation within the predetermined time after displaying the message output, the CPU 10 may perform the connection to the backup server 300 and the data transmission operation.

While the invention has been shown and described with reference to certain preferred embodiments thereof, it will be understood by those skilled in the art that various changes in form, improvements, and details may be made therein without departing from the spirit and scope of the invention as defined by the appended claims.

As described in the preferred embodiments, if the remaining capacity of the battery is not sufficient in the suspend mode, the data including the system status data stored in the memory is saved to the predetermined backup server via the data communication network, thereby previously preventing important data from losing although the system-down is abruptly occurred by the perfect discharge of the battery. The present invention can be applied to the notebook computer, the PDA or the Web PAD etc. with utility.

What is claimed is:
1. A method for saving data on the basis of the remaining capacity of a battery comprising:
  a first step for storing the present system status data into a memory in a suspend mode conversion and confirming continuously the remaining capacity of the battery;
  a second step for transmitting and storing the data stored in the memory to a backup server via a data commu- nication network when the confirmed remaining capacity of the battery is below a reference value; and a third step for returning to the suspend mode after the data is saved to the server.

2. The method according to claim 1, wherein in the second step, after network resources for communicating with the server via the network is activated and the data stored in the memory is transmitted to the server via the network, the network resources is again non-activated according to the suspend mode.

3. The method according to claim 1, wherein the connection to the server in the second step is preformed on the basis of an address of the backup server defined uniquely in the data communication network and stored previously in a predetermined non-volatile region.

4. The method according to claim 3, wherein in the third step, a backup information indicating that a backup copy of the data is saved in the server is stored to a predetermined non-volatile region and then the suspend mode is performed again.

5. In a system which the data is saved to the server through a backup process of the method defined in the claim 4, a method for resuming operations comprising:

a fourth step for confirming whether the backup information exists in the predetermined non-volatile region when the operation restart is requested;

a fifth step for confirming whether the system status data is stored in the memory when the backup information exists;

a sixth step for making the network resources activated when the system status data is not stored in the memory;

a seventh step for requesting the transmission of the saved data to the server by connecting to the server with the activated network resources;

an eighth step for storing the data received from the server according to the transmission request to the memory; and a ninth step for returning to the state prior to the suspend mode by using the data stored in the memory when the data storage is completed.

6. The method according to claim 5, wherein the operation restart request is a resume mode request, a wake-up mode request or a system power-on request.

7. The method according to claim 5, wherein the connection to the server in the seventh step is preformed on the basis of the address of the backup server defined uniquely in the data communication network and stored previously in the predetermined non-volatile region.

8. The method according to claim 5, wherein in the fourth step, when the backup information does not exist, the step is progressed to a system booting step.

9. The method according to claim 5, wherein in the fifth step, when it is confirmed that the system status data is stored in the memory, the fifth step is proceed to a step for returning to the state prior to the suspend mode on the basis of the data stored in the memory.

10. The method according to claim 5, wherein the method further comprises a step for removing the backup information after the data received from the server is stored to the memory in the eighth step.

11. In a portable computer system which resume operations from a suspend mode, a method for resuming the operations comprising:

a first step for checking whether system status data just before the suspend mode is saved in a backup server;

a second step for connecting to the backup server via a data communication network and receiving the system status data saved in the backup server according to the checking result; and a third step for returning to the state prior to the suspend mode using the received system status data.

12. The method according to claim 11, wherein the checking of the first step is performed by confirming whether a backup information, indicating that a backup copy of the system status data is saved in the backup server, is stored in a predetermined non-volatile region of the system.

13. The method according to claim 11, wherein the connection to the server in the second step is performed, on the basis of an address of the backup server defined uniquely in the data communication network and stored previously in a predetermined non-volatile region of the system.

14. The method according to claim 12, wherein the method further comprises a step for removing the backup information after receiving the system status data from the server in the second step.

15. A method for resuming operations for a portable computer system having a CPU, comprising:

completely discharging the battery;

charging the completely discharged battery by a user via a power-on mode of the portable computer system to control a power controller of the portable computer system to supply system power and suspend power to the portable computer system;

discriminating whether backup-information is set as an enable state by searching a specific BIOS register of the CPU; and confirming if portable computer system status data exists in a computer random access memory if the backup information is set as an enable state.

16. A method of saving data on the basis of the remaining capacity of a battery and for resuming operation for a portable computer system having a CPU, comprising storing the present system status data into a memory in a suspend mode conversion and confirming continuously the remaining capacity of the battery;

transmitting and storing the data stored in the memory to a backup server via a data communication network when the confirmed remaining capacity of the battery is below a reference value; and returning to the suspend mode after the data is saved to the server;

completely discharging the battery;

charging the completely discharged battery by a user via a power-on mode of the portable computer system to control a power controller of the portable computer system to supply system power and suspend power to the portable computer system;

discriminating whether backup-information is set as an enable state by searching a specific BIOS register of the CPU; and confirming if portable computer system status data exists in a computer random access memory if the backup information is set as an enable state.

* * * * *